(12) United States Patent
Osaki

(10) Patent No.: US 9,499,044 B2
(45) Date of Patent: Nov. 22, 2016

(54) VEHICLE WITH AIR CLEANER

(71) Applicant: YAMAHA HATSUDOKI KABUSHIKI KAISHA, Iwata-shi, Shizuoka (JP)

(72) Inventor: Hayato Osaki, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 0 days.

(21) Appl. No.: 14/729,212

(22) Filed: Jun. 3, 2015

(65) Prior Publication Data
US 2015/0375614 A1 Dec. 31, 2015

(30) Foreign Application Priority Data
Jun. 27, 2014 (JP) ................. 2014-132922

(51) Int. Cl.
| | | |
|---|---|---|
| *B60K 13/02* | (2006.01) | |
| *B60K 5/00* | (2006.01) | |
| *B60N 2/01* | (2006.01) | |
| *F02M 35/02* | (2006.01) | |
| *F02M 35/024* | (2006.01) | |
| *F02M 35/04* | (2006.01) | |
| *F02M 35/16* | (2006.01) | |
| *F02M 35/08* | (2006.01) | |

(52) U.S. Cl.
CPC ............. *B60K 13/02* (2013.01); *B60K 5/00* (2013.01); *B60N 2/01* (2013.01); *F02M 35/0201* (2013.01); *F02M 35/024* (2013.01); *F02M 35/0216* (2013.01); *F02M 35/02416* (2013.01); *F02M 35/02483* (2013.01); *F02M 35/02491* (2013.01); *F02M 35/048* (2013.01); *F02M 35/08* (2013.01); *F02M 35/162* (2013.01); *B60K 2005/003* (2013.01); *B60Y 2200/124* (2013.01)

(58) Field of Classification Search
CPC ........ B60K 13/02; B60K 5/00; B60K 13/06; B60N 2/01; F02M 35/0201; F02M 35/024; F02M 35/048; F02M 35/162; F02M 35/164; F02M 35/02; F02M 35/04; B60Y 2200/20; B60Y 2200/124
See application file for complete search history.

(56) References Cited

U.S. PATENT DOCUMENTS

| | | | | |
|---|---|---|---|---|
| 5,086,858 A | * | 2/1992 | Mizuta | B60K 11/06 123/41.56 |
| 7,168,516 B2 | | 1/2007 | Nozaki et al. | |
| 8,215,443 B2 | | 7/2012 | Miura | |
| 8,292,984 B2 | * | 10/2012 | Baseotto | B01D 46/0024 55/498 |
| 2006/0087152 A1 | * | 4/2006 | Kuriakose | B62D 33/02 296/184.1 |
| 2007/0045029 A1 | * | 3/2007 | Nozaki | B60K 13/02 180/291 |
| 2010/0078240 A1 | * | 4/2010 | Miura | B60K 13/02 180/68.3 |
| 2011/0094816 A1 | * | 4/2011 | Suzuki | B62D 21/183 180/291 |
| 2011/0214933 A1 | | 9/2011 | Kawazumi et al. | |
| 2012/0152632 A1 | * | 6/2012 | Azuma | F02M 35/162 180/68.3 |
| 2012/0252343 A1 | * | 10/2012 | Kimura | B29C 49/20 454/143 |
| 2014/0083790 A1 | * | 3/2014 | Shomura | F02M 35/162 180/291 |
| 2014/0224563 A1 | * | 8/2014 | Shinbori | B60K 5/00 180/291 |
| 2014/0296030 A1 | * | 10/2014 | Norita | F16H 61/0009 477/77 |

* cited by examiner

*Primary Examiner* — John Walters
*Assistant Examiner* — Brian Swenson
(74) *Attorney, Agent, or Firm* — Keating and Bennett, LLP

(57) ABSTRACT

An ROV includes a body frame, a plurality of seats, a cargo bed, and an air cleaner. The plurality of seats are supported by the body frame, and aligned in a width direction of the ROV. The cargo bed is disposed rearward relative to the seats, and supported by the body frame. The cargo bed includes a placement surface on which cargo is to be placed. The air cleaner is disposed rearward relative to the seats, and at least partially exposed above the placement surface.

16 Claims, 12 Drawing Sheets

VEHICLE WITH AIR CLEANER

This application claims priority to Japanese Patent Application No. 2014-132922 filed in Japan on Jun. 27, 2014, the entire contents of which are hereby incorporated by reference.

BACKGROUND OF THE INVENTION

1. Field of the Invention

The present invention relates generally to vehicles, and more particularly relates to a vehicle including a plurality of seats aligned in a width direction of the vehicle.

2. Description of the Related Art

Some vehicles known in the art include a plurality of seats aligned in a width direction thereof and are designed to travel over rough terrain. Among these vehicles are a recreational off-highway vehicle (hereinafter referred to as an "ROV") and a side-by-side all terrain vehicle (ATV). Such vehicles are provided with an air cleaner upstream of a suction pipe through which air is supplied to an engine. This arrangement aims to prevent foreign matter, such as dust or dirt, from mixing into the air to be supplied to the engine (which will hereinafter be referred to as "suction air").

For example, U.S. Patent Application Publication No. 2011/0214933 and U.S. Pat. No. 7,168,516 each disclose a vehicle including seats, an air cleaner disposed behind the seats, and a cargo bed which is disposed behind the seats and on which cargo is to be placed. The air cleaner is disposed under the cargo bed.

Unfortunately, when the vehicle travels over rough terrain, foreign matter, such as dust, is likely to mix into the suction air, and the amount of dust, for example, contained in the suction air tends to increase. This necessitates frequent maintenance of the air cleaner, which includes, for example, cleaning and replacement of a filter element inside the air cleaner. For this reason, it is preferable that maintenance of the air cleaner is facilitated. However, the vehicle disclosed in each of U.S. Patent Application Publication No. 2011/0214933 and U.S. Pat. No. 7,168,516 makes it difficult for a worker to reach the air cleaner because the air cleaner is disposed under the cargo bed. More specifically, a worker has to detach a component such as an outer cover, for example, from the vehicle to reach the air cleaner. This means that a worker cannot easily reach the air cleaner, and thus cannot easily perform maintenance of the air cleaner.

SUMMARY OF THE INVENTION

Accordingly, preferred embodiments of the present invention facilitate maintenance of an air cleaner of a vehicle, such as an ROV, which includes a plurality of seats aligned in a width direction of the vehicle.

A vehicle according to a preferred embodiment of the present invention includes a body frame, a plurality of seats, a cargo bed, and an air cleaner. The plurality of seats are supported by the body frame and aligned in a width direction of the vehicle. The cargo bed is disposed rearward relative to the seats and supported by the body frame. The cargo bed includes a placement surface on which cargo is to be placed. The air cleaner is disposed rearward relative to the seats. The air cleaner is at least partially exposed above the placement surface.

The air cleaner of the vehicle according to the present preferred embodiment of the present invention is at least partially exposed above the placement surface of the cargo bed. This enables a worker to easily reach the air cleaner when performing maintenance on the air cleaner. For example, a worker has to remove a component such as an outer cover to reach an air cleaner when the air cleaner is disposed below a placement surface of a cargo bed, as in the vehicles known in the art. However, the vehicle according to the present preferred embodiment of the present invention allows a worker to directly reach the air cleaner without having to remove a component such as an outer cover. Consequently, the vehicle according to the preferred embodiments of the present invention facilitates maintenance of the air cleaner.

According to another preferred embodiment of the present invention, a center position of the air cleaner in an up-down direction thereof is preferably located above the placement surface.

The air cleaner according to this preferred embodiment is largely exposed above the placement surface of the cargo bed. This enables a worker to more easily reach the air cleaner, thus facilitating maintenance of the air cleaner.

According to still another preferred embodiment of the present invention, the air cleaner preferably includes an air cleaner case including a first opening, a filter element detachably disposed inside the air cleaner case, and a lid detachably attached to the air cleaner case to cover the first opening. The lid is preferably exposed above the placement surface.

The lid of the air cleaner according to this preferred embodiment is exposed above the placement surface of the cargo bed. This enables the lid to be easily attached to and detached from the air cleaner case. Consequently, the filter element inside the air cleaner case is easily attached to and detached from the air cleaner case, thus facilitating maintenance of the air cleaner.

According to yet another preferred embodiment of the present invention, the filter element preferably has a tubular or substantially tubular shape, and the lid is preferably disposed along an extension line of an axis of the filter element.

This preferred embodiment allows the filter element to be easily attached to and detached from the air cleaner case by merely axially moving the filter element.

According to still yet another preferred embodiment of the present invention, the placement surface of the cargo bed preferably includes a second opening. The air cleaner and the second opening preferably overlap with each other in a plan view of the vehicle.

The air cleaner and the cargo bed according to this preferred embodiment are disposed more compactly than when the air cleaner and the second opening do not overlap with each other in the plan view of the vehicle, or than when the placement surface is provided with no second opening.

According to another preferred embodiment of the present invention, the cargo bed preferably includes, behind the air cleaner, a vertical wall extending upward from the placement surface and extending in the width direction of the vehicle.

This preferred embodiment prevents interference between the air cleaner and cargo placed on the cargo bed.

According to still another preferred embodiment of the present invention, the plurality of seats preferably include a first seat supported by the body frame and a second seat disposed rightward of the first seat and supported by the body frame. The vehicle preferably further includes a battery case disposed between the first and second seats, and a battery disposed inside the battery case. A left end of the air cleaner is preferably located leftward relative to the battery. A right end of the air cleaner is preferably located rightward relative to the battery.

The air cleaner according to this preferred embodiment is compactly disposed substantially in a widthwise center of the vehicle, thus providing a large space for a component other than the air cleaner.

According to yet another preferred embodiment of the present invention, the air cleaner preferably includes a first suction pipe disposed above the battery. The first suction pipe preferably includes an air inlet through which air is sucked into the air cleaner from outside the air cleaner. The air inlet preferably communicates with an interior of the battery case.

The air inlet according to this preferred embodiment communicates with the interior of the battery case, and thus foreign matter, such as mud and dust, thrown up during traveling of the vehicle is unlikely to enter the air inlet. Consequently, the air cleaner requires less frequent maintenance.

According to still yet another preferred embodiment of the present invention, the first seat preferably includes a first seat portion on which a first occupant sits, and the second seat preferably includes a second seat portion on which a second occupant sits. The air inlet is preferably disposed above the first and second seat portions.

The air inlet according to this preferred embodiment is disposed at a relatively high position, and thus foreign matter, such as mud and dust, thrown up during traveling of the vehicle is unlikely to enter the air inlet. Consequently, the air cleaner requires less frequent maintenance.

According to another preferred embodiment of the present invention, the vehicle preferably further includes an engine disposed behind the first and second seats and under the air cleaner. The air cleaner preferably includes at least one second suction pipe connected to the engine. A left end of the engine is preferably located leftward relative to the battery. A right end of the engine is preferably located rightward relative to the battery.

The engine according to this preferred embodiment is disposed under the air cleaner, thus shortening the second suction pipe. This reduces the cost of the vehicle and simplifies the structure of the vehicle. The engine is compactly disposed substantially in the widthwise center of the vehicle, thus providing a large space for a component other than the engine.

The various preferred embodiments of the present invention facilitate maintenance of an air cleaner of a vehicle including a plurality of seats aligned in a width direction of the vehicle.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
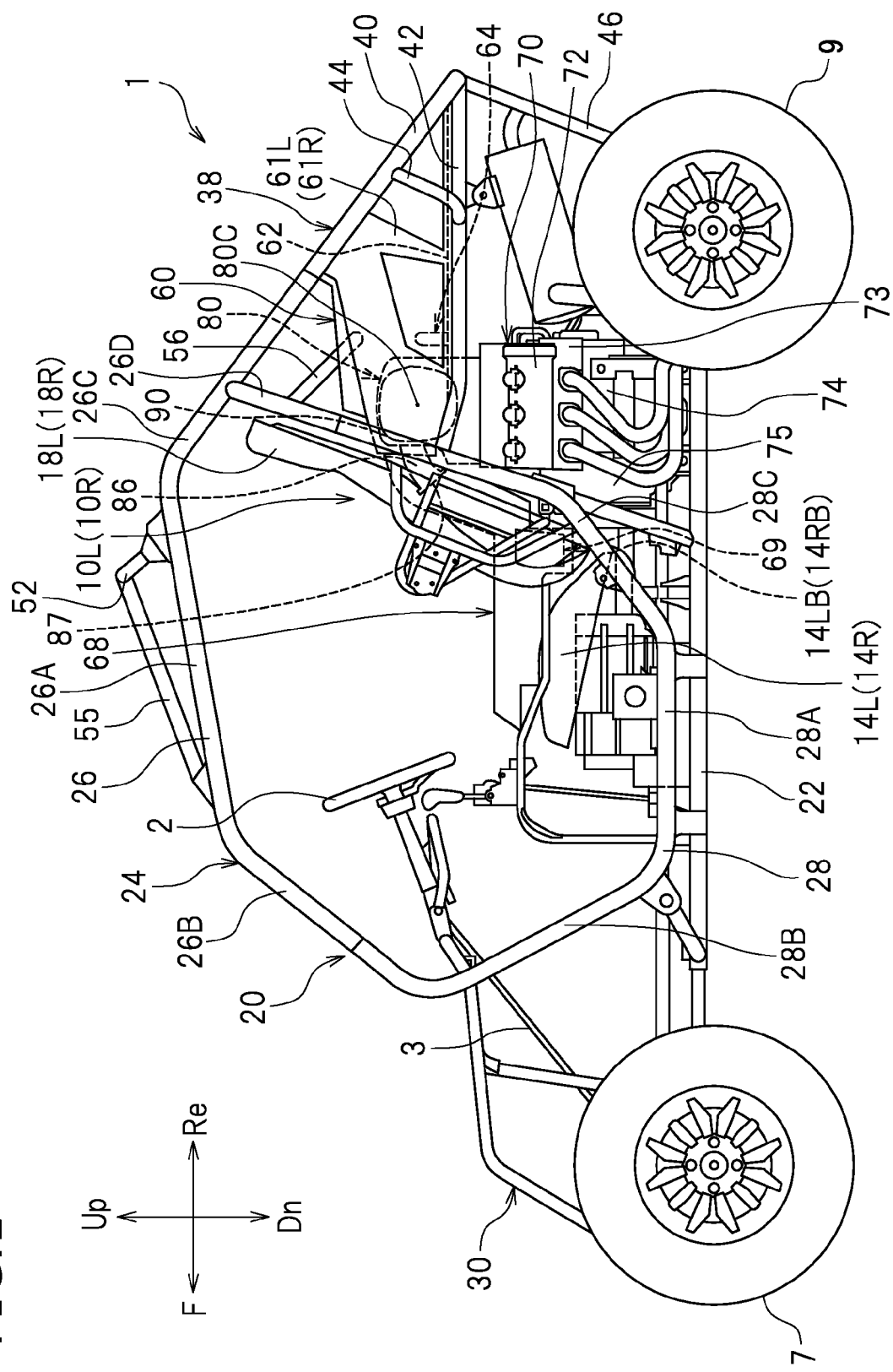
FIG. 1 is a left side view of an ROV according to a preferred embodiment of the present invention.

Hereinafter, preferred embodiments of the present invention will be described. As illustrated in FIG. 1, a vehicle according to the present preferred embodiment is preferably a recreational off-highway vehicle (ROV) 1, for example. The ROV 1 is suitable for traveling over rough terrain. The vehicle according to the present invention is not limited to an ROV. The vehicle according to the present invention may be a motorcycle, a motor tricycle, or an all terrain vehicle (ATV), for example.

Unless otherwise noted, the terms "front", "rear", "right", "left", "up", and "down" respectively refer to front, rear, right, left, up, and down with respect to an occupant sitting on a first seat portion 14L of a first seat 10L of the ROV 1 in the following description. The terms "up" and "down" respectively refer to a vertically upward direction and a vertically downward direction when the ROV 1 is stationary on a horizontal plane. Reference signs "F", "Re", "R", "L", "Up", and "Dn" in the drawings respectively represent front, rear, right, left, up, and down.

As illustrated in FIG. 1, the ROV 1 preferably includes a body frame 20; the first seat 10L; a second seat 10R (see also FIG. 2); a cargo bed 60; an engine 70; an air cleaner 80; right and left front wheels 7; and right and left rear wheels 9.

The body frame 20 is preferably a pipe frame. The body frame 20 preferably includes a main frame 22 extending in a front-rear direction of the vehicle; a center frame 24 disposed above the main frame 22; a front frame 30 disposed in front of the center frame 24; and a rear frame 38 disposed behind the center frame 24.

The center frame 24 preferably includes upper center frames 26 and lower center frames 28. The upper center frames 26 are disposed above the lower center frames 28. Each upper center frame 26 is connected to the associated lower center frame 28. Each upper center frame 26 preferably includes a first portion 26A extending substantially in the front-rear direction of the vehicle; a second portion 26B extending obliquely downward and forward from a front end of the first portion 26A; a third portion 26C extending obliquely downward and rearward from a rear end of the first portion 26A; and a fourth portion 26D extending obliquely downward and forward from a location along the third portion 26C. Each lower center frame 28 is disposed above the main frame 22. Each lower center frame 28 is connected to the main frame 22. Each lower center frame 28 preferably includes a first portion 28A extending in the front-rear direction of the vehicle; a second portion 28B extending obliquely upward and forward from a front end of the first portion 28A; and a third portion 28C extending obliquely upward and rearward from a rear end of the first portion 28A. Each first portion 28A is connected to the main frame 22. Each second portion 28B is connected to the second portion 26B of the associated upper center frame 26. Each third portion 28C is connected to the fourth portion 26D of the associated upper center frame 26.

Figure 2:
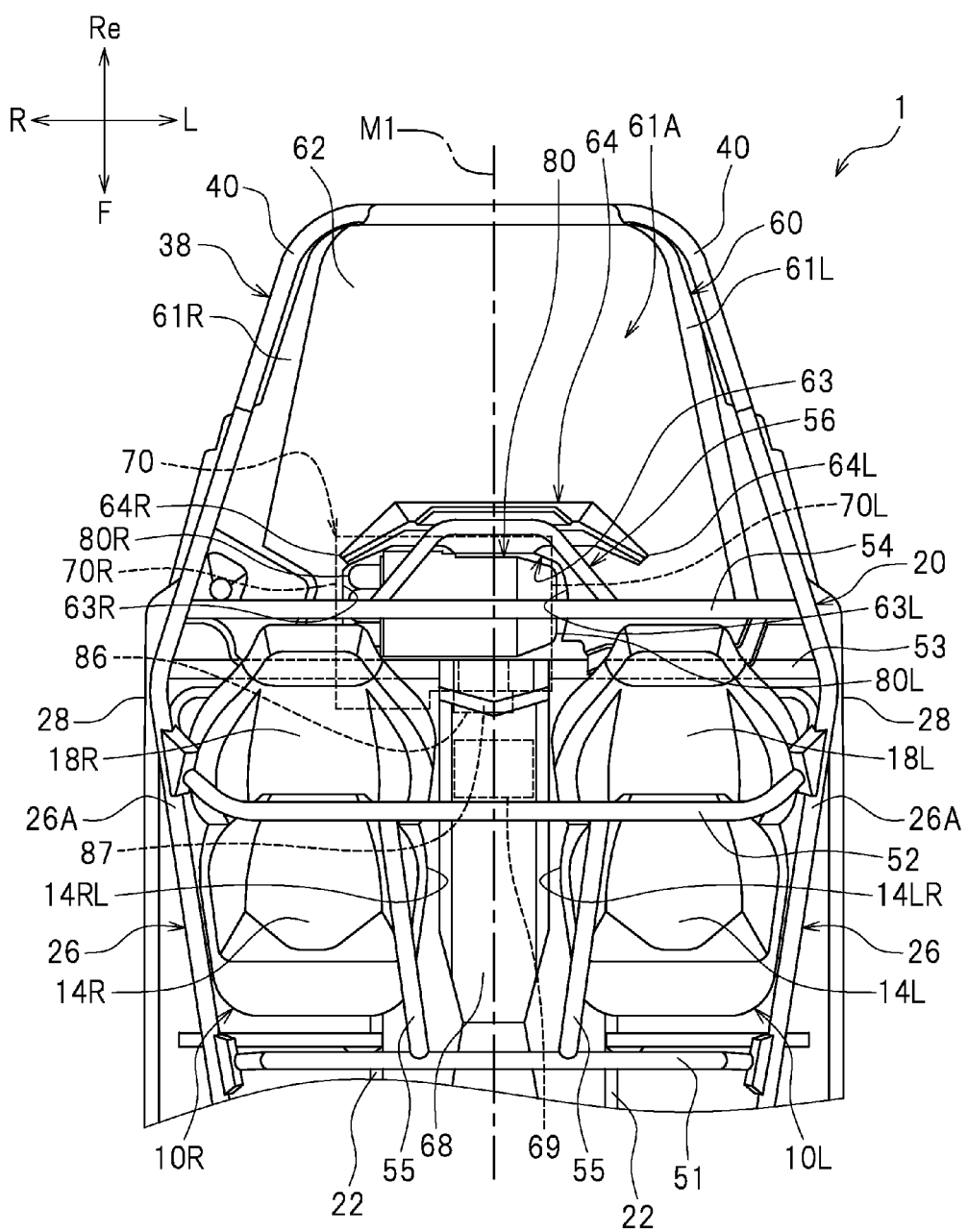
FIG. 2 is a plan view of the ROV according to a preferred embodiment of the present invention.

As illustrated in FIG. 2, the body frame 20 preferably further includes a first cross member 51, a second cross member 52, a third cross member 53, and a fourth cross member 54. The first to fourth cross members 51 to 54 each extend in a width direction of the vehicle. The second cross member 52 is disposed rearward relative to the first cross member 51. The first and second cross members 51 and 52 connect the right and left upper center frames 26 to each other. More specifically, the first and second cross members 51 and 52 connect the right and left first portions 26A to each other. The body frame 20 preferably further includes two connection frames 55 connecting the first and second cross members 51 and 52 to each other. The connection frames 55 extend substantially in the front-rear direction of the vehicle. The third cross member 53 is disposed rearward relative to the second cross member 52. The third cross member 53 connects the right and left lower center frames 28 to each other. The fourth cross member 54 is disposed rearward relative to the third cross member 53. The fourth cross member 54 connects the right and left upper center frames 26 to each other. More specifically, the fourth cross member 54 connects the right and left fourth portions 26D (see FIG. 1) to each other. The body frame 20 preferably further includes a guard frame 56 extending rearward from the fourth cross member 54. As illustrated in FIG. 1, the guard frame 56 extends obliquely downward and rearward from the fourth cross member 54 (see FIG. 2). Note that the right and left rear wheels 9 are not illustrated in FIG. 2.

As illustrated in FIG. 1, the rear frame 38 preferably includes upper rear frames 40, lower rear frames 42, first rear down frames 44, and second rear down frames 46. Each upper rear frame 40 extends obliquely downward and rearward from the third portion 26C of the associated upper center frame 26. Each lower rear frame 42 extends rearward from a location along the third portion 28C of the associated lower center frame 28. A rear end of each upper rear frame 40 is connected to a rear end of the associated lower rear frame 42. Each first rear down frame 44 extends obliquely downward and forward from a location along the associated upper rear frame 40. Each first rear down frame 44 is connected to a position along the associated lower rear frame 42. Each second rear down frame 46 extends obliquely downward and forward from the rear end of the associated lower rear frame 42. Each second rear down frame 46 is connected to a rear end of the main frame 22.

As illustrated in FIG. 1, the ROV 1 preferably includes a steering wheel 2. A steering shaft 3 is attached to the steering wheel 2. The ROV 1 preferably includes the right and left front wheels 7, and the right and left rear wheels 9. The right and left front wheels 7 are attached to an axle (not illustrated) provided on the front frame 30. The right and left rear wheels 9 are attached to an axle (not illustrated) provided on the rear frame 38. The right and left front wheels 7 are controlled by the steering wheel 2.

As illustrated in FIG. 2, the first and second seats 10L and 10R are supported by the body frame 20. More specifically, the first and second seats 10L and 10R are supported by the main frame 22. As illustrated in FIG. 1, the first seat 10L is disposed behind the steering wheel 2. As illustrated in FIG. 2, the second seat 10R is disposed rightward of the first seat 10L. The first and second seats 10L and 10R are aligned in the width direction of the vehicle. The first seat 10L preferably includes the first seat portion 14L on which an occupant sits, and a first backrest portion 18L. As illustrated in FIG. 1, the first seat portion 14L is disposed above the first portion 28A of the associated lower center frame 28. The first backrest portion 18L is disposed forward relative to the fourth portion 26D of the associated upper center frame 26. The first backrest portion 18L is disposed forward relative to the third portion 28C of the associated lower center frame 28. As illustrated in FIG. 2, the second seat 10R preferably includes a second seat portion 14R on which another occupant sits, and a second backrest portion 18R. As illustrated in FIG. 1, the second seat portion 14R is disposed above the first portion 28A of the associated lower center frame 28. The second backrest portion 18R is disposed forward relative to the fourth portion 26D of the associated upper center frame 26. The second backrest portion 18R is disposed forward relative to the third portion 28C of the associated lower center frame 28.

As illustrated in FIG. 1, the ROV 1 preferably further includes a battery case 68, and a battery 69 disposed inside the battery case 68. As illustrated in FIG. 2, the battery case 68 is disposed between the first and second seats 10L and 10R. The battery 69 is disposed between the first and second seats 10L and 10R. The battery 69 is disposed forward relative to the air cleaner 80. As illustrated in FIG. 1, the battery 69 is disposed above a lower end 14LB of the first seat portion 14L and a lower end 14RB of the second seat portion 14R.

As illustrated in FIG. 1, the engine 70 is supported by the body frame 20. More specifically, the engine 70 is supported by the main frame 22. The engine 70 is disposed below the lower rear frames 42. The engine 70 is disposed under the air cleaner 80. As illustrated in FIG. 2, the engine 70 is disposed rearward relative to the first and second seats 10L and 10R. The engine 70 is disposed rearward relative to the first seat portion 14L of the first seat 10L, and the second seat portion 14R of the second seat 10R. A left end 70L of the engine 70 is located leftward relative to the battery 69. A right end 70R of the engine 70 is located rightward relative to the battery 69. The engine 70 is disposed on a vehicle center line M1. The term "vehicle center line" refers to a line extending in the front-rear direction of the vehicle and passing through a vehicle width midpoint between the right and left front wheels 7 (see FIG. 1) and a vehicle width midpoint between the right and left rear wheels 9 (see FIG. 1) in a plan view of the vehicle.

As illustrated in FIG. 1, the engine 70 preferably includes a crankcase 75, a cylinder body 74, a cylinder head 73, and a cylinder head cover 72. The cylinder body 74 extends upward from the crankcase 75. The cylinder head 73 is disposed on the cylinder body 74 and connected to an upper portion of the cylinder body 74. The cylinder head cover 72 is disposed on the cylinder head 73 and connected to an upper portion of the cylinder head 73.

As illustrated in FIG. 1, the ROV 1 preferably includes the cargo bed 60. The cargo bed 60 is disposed rearward relative to the first and second seats 10L and 10R. The cargo bed 60 is disposed above the engine 70. The cargo bed 60 is attached to the rear frame 38. The cargo bed 60 is disposed above the lower rear frames 42. The cargo bed 60 preferably includes a bottom wall 61A (see FIG. 2), a left wall 61L extending upward from a left end of the bottom wall 61A, and a right wall 61R extending upward from a right end of the bottom wall 61A. The right and left walls 61R and 61L extend substantially in the front-rear direction of the vehicle. As illustrated in FIG. 2, the cargo bed 60 preferably includes a placement surface 62 on which cargo is to be placed. The placement surface 62 is defined by the bottom wall 61A. The placement surface 62 is provided with an opening 63. A left end 63L of the opening 63 is located leftward relative to a right end 14LR of the first seat portion 14L of the first seat 10L. A right end 63R of the opening 63 is located rightward relative to a left end 14RL of the second seat portion 14R of the second seat 10R. The cargo bed 60 preferably further includes a vertical wall 64. The vertical wall 64 extends upward from the placement surface 62. The vertical wall 64 also extends in the width direction of the vehicle. The vertical wall 64 is disposed behind the air cleaner 80. A left end 64L of the vertical wall 64 is located leftward relative to a left end 80L of the air cleaner 80. A right end 64R of the vertical wall 64 is located rightward relative to a right end 80R of the air cleaner 80. As illustrated in FIG. 1, the guard frame 56 is disposed above the vertical wall 64. As illustrated in FIG. 2, the vertical wall 64 overlaps with the guard frame 56 in the plan view of the vehicle.

As illustrated in FIG. 1, the air cleaner 80 is disposed rearward relative to the first and second seats 10L and 10R. At least a portion of the air cleaner 80 is located above the placement surface 62 of the cargo bed 60. At least a portion of the air cleaner 80 is exposed above the placement surface 62. A center position 80C of the air cleaner 80 in an up-down direction thereof is located above the placement surface 62. The up-down center position 80C of the air cleaner 80 is exposed above the placement surface 62. As illustrated in FIG. 2, the air cleaner 80 is disposed on the vehicle center line M1. The air cleaner 80 overlaps with the opening 63 of the placement surface 62 in the plan view of the vehicle. The placement surface 62 of the cargo bed 60 is disposed rightward and leftward of the air cleaner 80 in the plan view of the vehicle. The left end 80L of the air cleaner 80 is located leftward relative to the battery 69. The right end 80R of the air cleaner 80 is located rightward relative to the battery 69.

Figure 3:
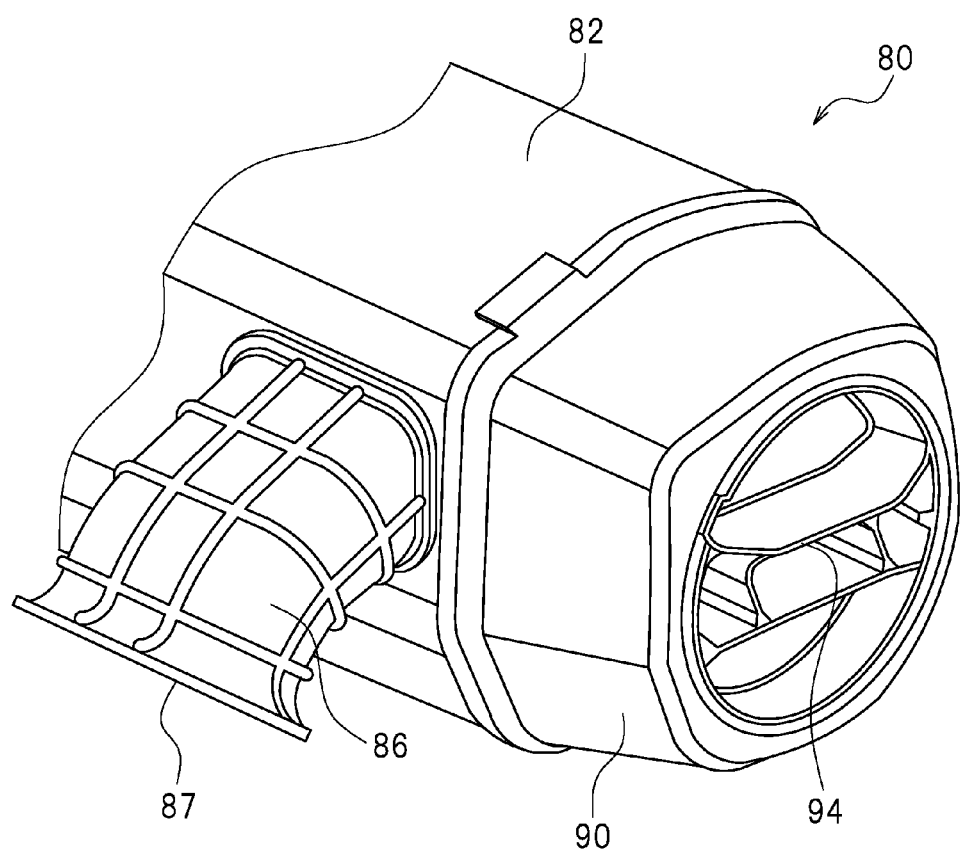
FIG. 3 is a perspective view of a portion of an air cleaner according to a preferred embodiment of the present invention.
Figure 4:
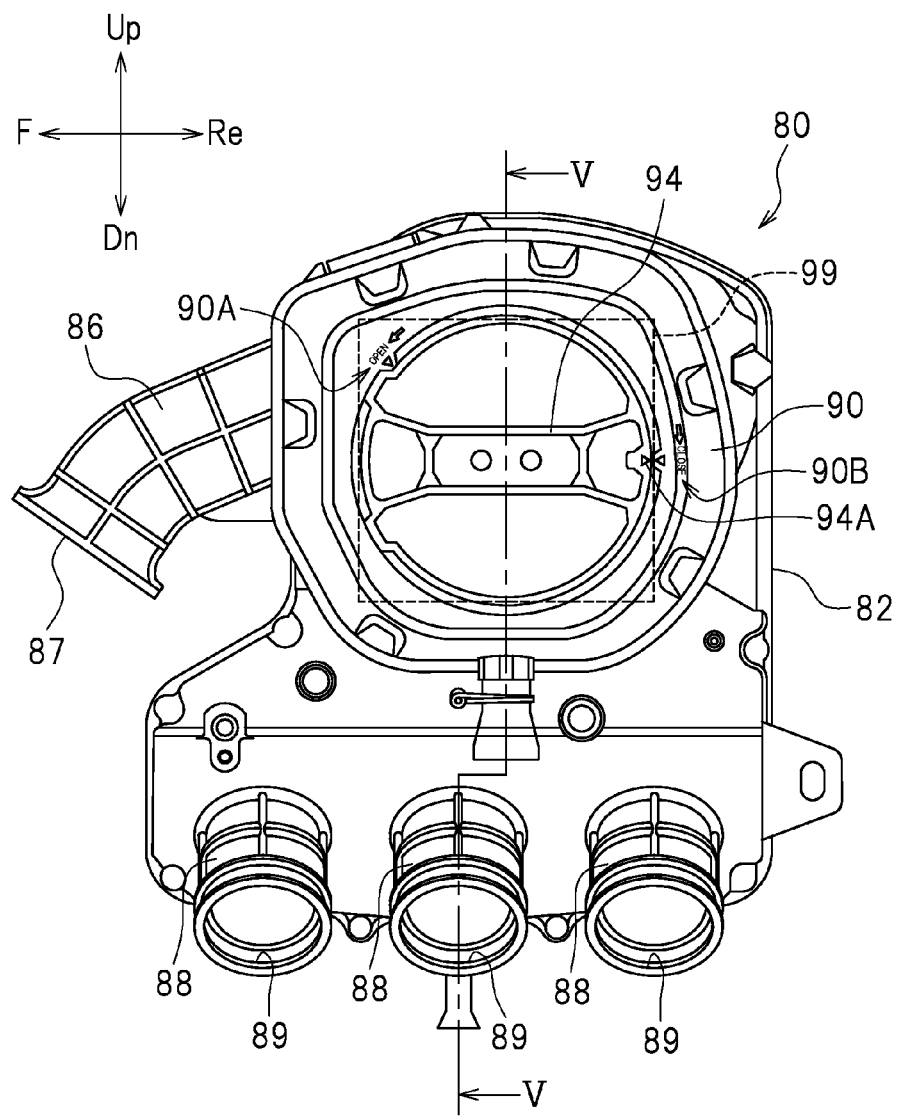
FIG. 4 is a left side view of the air cleaner according to a preferred embodiment of the present invention.
Figure 5:
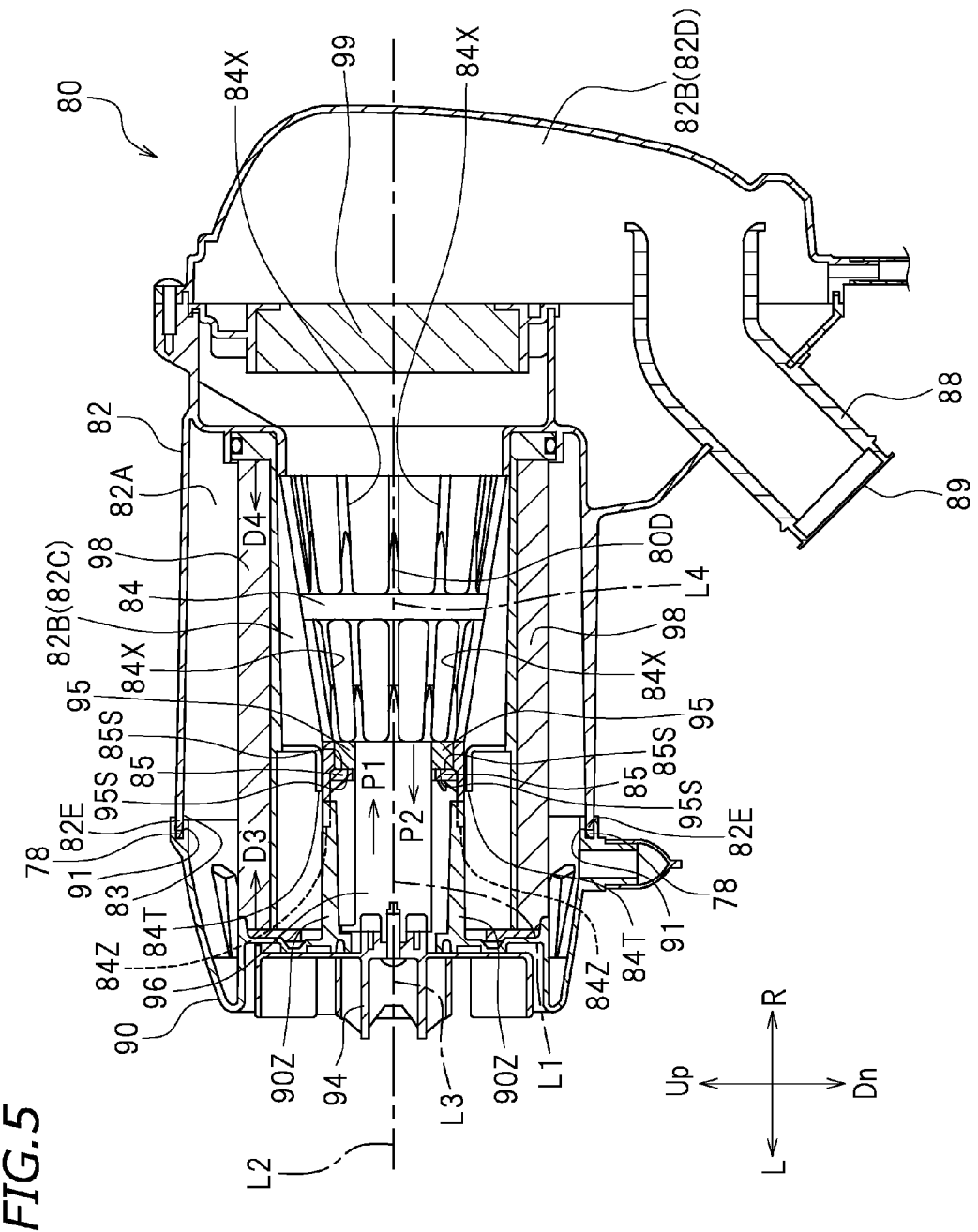
FIG. 5 is a cross-sectional view taken along the line V-V of FIG. 4.

As illustrated in FIG. 3, the air cleaner 80 preferably includes an air cleaner case 82; a lid 90 detachably attached to the air cleaner case 82; a first suction pipe 86; and second suction pipes 88 (see FIG. 4). As illustrated in FIG. 5, the air cleaner 80 preferably further includes a first filter element 98 and a second filter element 99. The first filter element 98 preferably has a tubular or substantially tubular shape. The second filter element 99 preferably has a rectangular or substantially rectangular shape. The first and second filter elements 98 and 99 are detachably disposed inside the air cleaner case 82.

As illustrated in FIG. 5, the air cleaner case 82 is provided with an opening 83. The air cleaner case 82 preferably includes a support 84. The support 84 is connected to the air cleaner case 82. The support 84 is disposed inside the air cleaner case 82. The support 84 is disposed inward of the first filter element 98. An axis L4 of the support 84 extends parallel or substantially parallel with an axis L1 of the first filter element 98. The axis L4 of the support 84 is preferably coaxial with the axis L1 of the first filter element 98. Alternatively, the axis L4 of the support 84 may be out of alignment with the axis L1 of the first filter element 98. The support 84 preferably has a truncated conical or substantially truncated conical shape. Alternatively, the support 84 may have a circular cylindrical or a substantially circular cylindrical shape or a rectangular or substantially rectangular prismatic shape. The support 84 is provided with a plurality of openings 84X through which air is allowed to flow. Although the support 84 preferably is disposed inside the air cleaner case 82 in the present preferred embodiment, the support 84 may protrude out of the air cleaner case 82 from inside the opening 83 of the air cleaner case 82. An end portion 84T of the support 84 is provided with a rotation stopper 84Z. The lid 90 is provided with a rotation stopper 90Z. The rotation stopper 84Z is caught by the rotation stopper 90Z, thus stopping the lid 90 from rotating relative to the air cleaner case 82.

As illustrated in FIG. 5, the lid 90 covers the opening 83 of the air cleaner case 82. The lid 90 is provided with a groove 91 into which an opening end portion 82E of the air cleaner case 82 is inserted. As illustrated in FIG. 1, the lid 90 is exposed above the placement surface 62 of the cargo bed 60. As illustrated in FIG. 5, the lid 90 is disposed along an extension line L2 of the axis L1 of the first filter element 98. The axis L1 is a center of rotation of the first filter element 98 and is located inward of the first filter element 98. The extension line L2 is preferably coaxial with the axis L1 and is located outside of the first filter element 98. The lid 90 is disposed on an end of the air cleaner case 82 opposite to a portion of the air cleaner case 82 where the second suction pipes 88 are disposed. The lid 90 is disposed leftward of a center position 80D of the air cleaner 80 in the vehicle width direction. The second suction pipes 88 are disposed rightward of the center position 80D of the air cleaner 80 in the vehicle width direction. The lid 90 is disposed above the second suction pipes 88.

As illustrated in FIG. 3, the lid 90 preferably includes a rotatable handle 94, and a rod 96 (see FIG. 6) connected to the handle 94. The handle 94 preferably has a disk shape or approximate disk shape. The handle 94 and the rod 96 are connected to each other with a bolt, for example (not illustrated). The handle 94 rotates by an angle of about 360 degrees or less, for example. The handle 94 preferably rotates by an angle of 180 degrees or less, for example. The handle 94 and the lid 90 are separate components. The handle 94 is rotatable relative to the lid 90. In the present preferred embodiment, the lid 90 is attached to the air cleaner case 82 so as to be non-rotatable relative to the air cleaner case 82. The handle 94 rotates relative to the air cleaner case 82. Alternatively, the handle 94 and the lid 90 may be molded in one piece so that the lid 90 is attached to the air cleaner case 82 so as to be rotatable relative to the air cleaner case 82.

As illustrated in FIG. 5, the handle 94 and the rod 96 are disposed along the extension line L2 of the axis L1 of the first filter element 98. A rotation axis L3 of the handle 94 extends parallel or substantially parallel with the axis L1 of the first filter element 98 and is located inward of the first filter element 98. The rotation axis L3 of the handle 94 may be located outward of the first filter element 98. The rotation axis L3 of the handle 94 is preferably coaxial with the axis L1 of the first filter element 98. The rotation axis L3 of the handle 94 may be out of alignment with the axis L1 of the first filter element 98. As illustrated in FIG. 4, the handle 94 overlaps with the second filter element 99 in a side view of the vehicle.

As illustrated in FIG. 5, the air cleaner 80 preferably includes first engagement portions 95 arranged to rotate in accordance with the rotation of the handle 94; and second engagement portions 85 arranged to engage with the first engagement portions 95.

Figure 6:
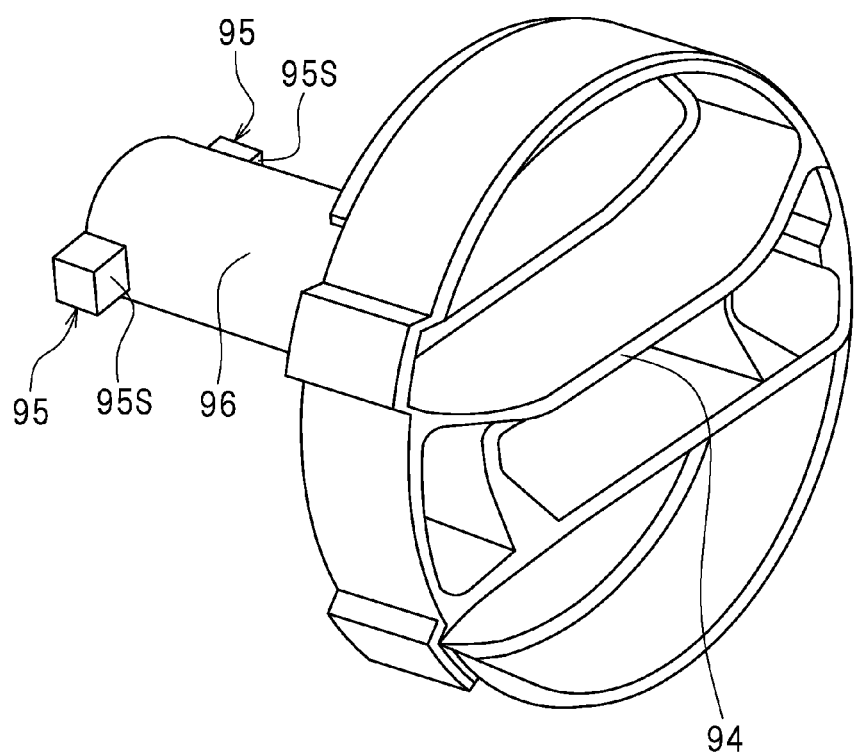
FIG. 6 is a perspective view of a handle and first engagement portions according to a preferred embodiment of the present invention.

As illustrated in FIG. 6, the first engagement portions 95 are provided on the rod 96. Each first engagement portion 95 protrudes outward from the rod 96 in a radial direction of the rod 96. Each first engagement portion 95 preferably includes a first engagement surface 95S arranged to come into contact with the associated second engagement portion 85 (see FIG. 7). Each first engagement surface 95S comes into contact with a second engagement surface 85S (see FIG. 7) of the associated second engagement portion 85 (which will be described below).

Figure 7:
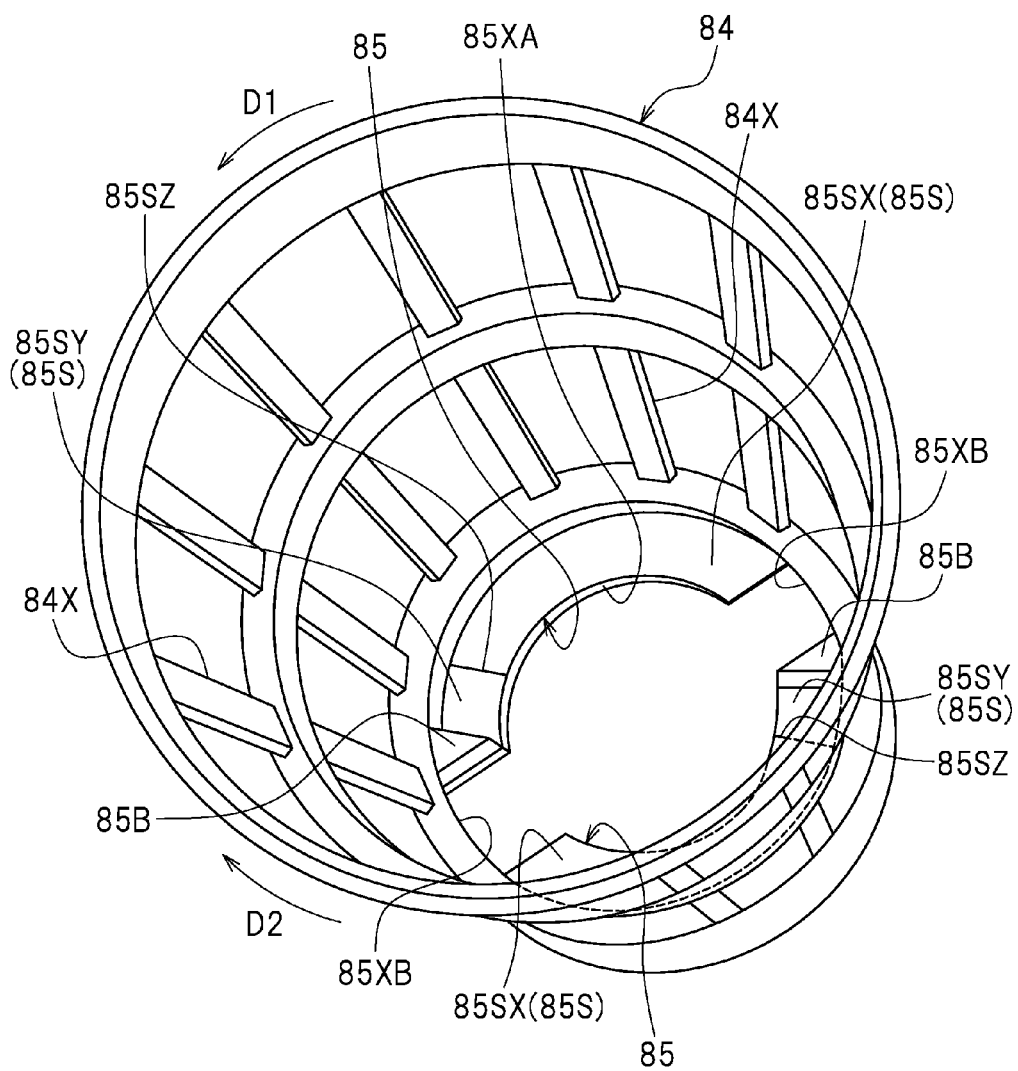
FIG. 7 is a perspective view of a support and second engagement portions according to a preferred embodiment of the present invention.

As illustrated in FIG. 5, each second engagement portion 85 is connected to the air cleaner case 82. Each second engagement portion 85 is provided on the support 84. As illustrated in FIG. 7, each second engagement portion 85 preferably includes the second engagement surface 85S arranged to come into contact with the first engagement surface 95S of the associated first engagement portion 95. Each second engagement portion 85 is provided with a first opening 85XA into which the rod 96 is inserted, and a second opening 85XB into which the associated first engagement portion 95 is inserted. The first and second openings 85XA and 85XB are preferably continuous with each other. As illustrated in FIG. 5, each second engagement surface 85S is disposed between the associated first engagement surface 95S and the handle 94 when the first and second engagement portions 95 and 85 are engaged with each other.

Figure 8:
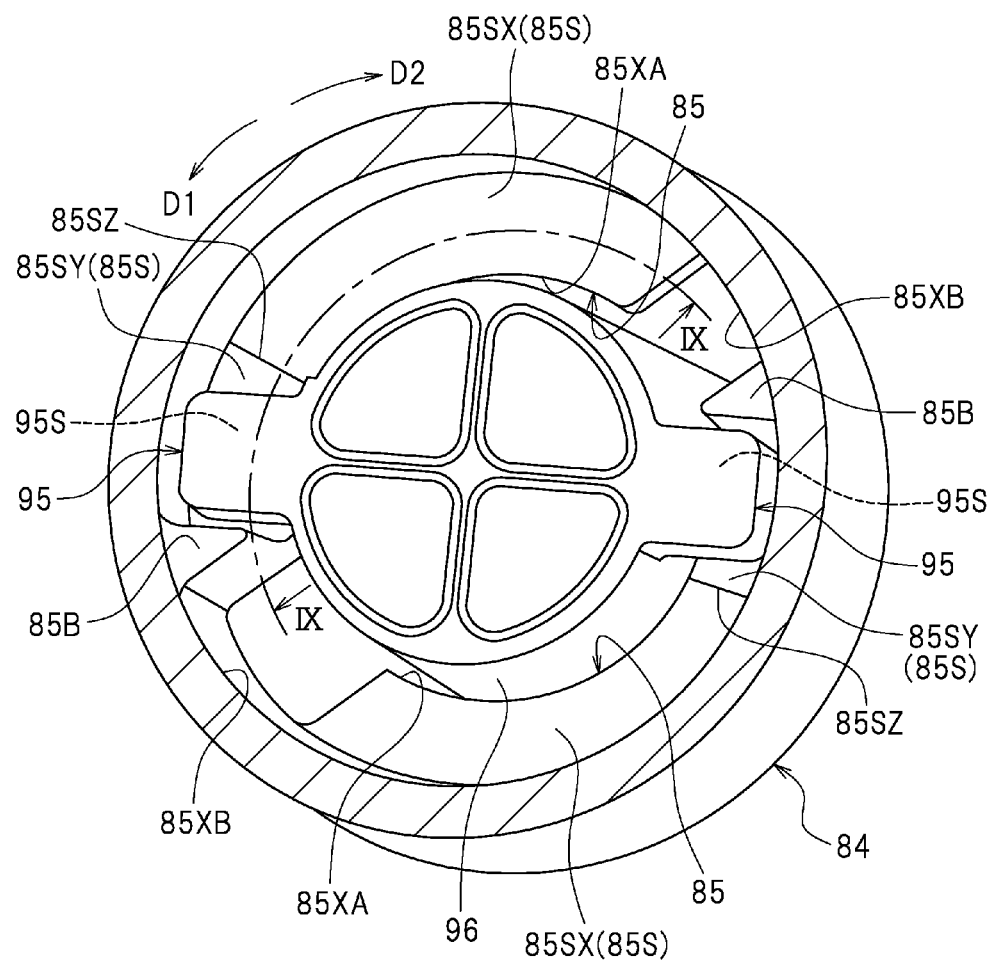
FIG. 8 is a perspective view of a portion of the air cleaner according to a preferred embodiment of the present invention, with the first and second engagement portions engaged with each other.
Figure 9:
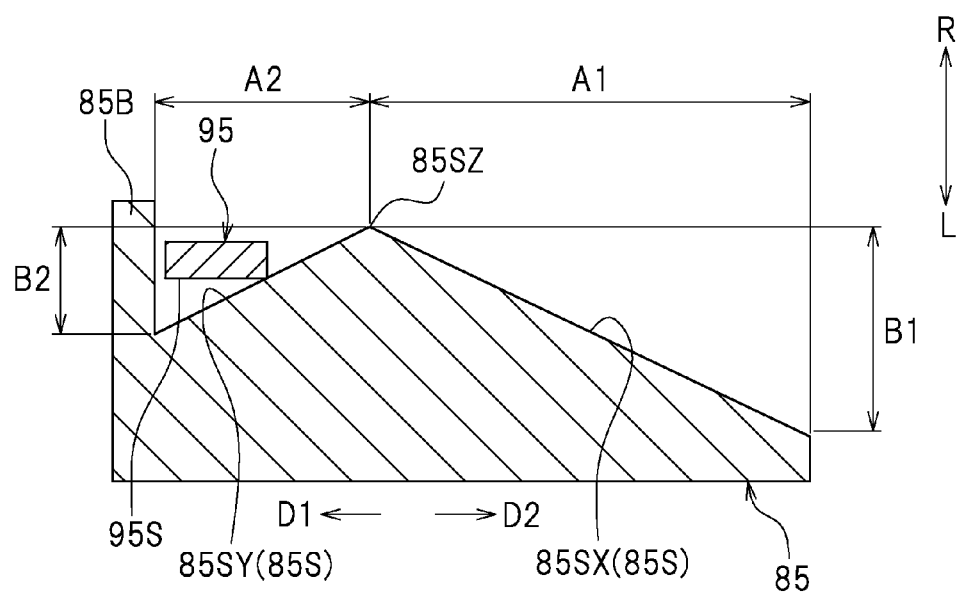
FIG. 9 is a cross-sectional view taken along the line IX-IX in FIG. 8.

As illustrated in FIG. 7, each second engagement surface 85S preferably includes a first inclined surface 85SX inclined in a direction away from the handle 94 along a first direction D1; and a second inclined surface 85SY inclined in a direction toward the handle 94 along the first direction D1. The term "direction away from the handle 94" refers to a direction extending along the rotation axis L3 of the handle 94 from the handle 94 toward the air cleaner case 82. In other words, the term "direction away from the handle 94" refers to a direction indicated by an arrow P1 in FIG. 5. The term "direction toward the handle 94" refers to a direction extending along the rotation axis L3 of the handle 94 from the air cleaner case 82 toward the handle 94. In other words, the term "direction toward the handle 94" refers to a direction indicated by an arrow P2 in FIG. 5. As illustrated in FIG. 8, the first and second inclined surfaces 85SX and 85SY are preferably continuous with each other at points 85SZ of the second engagement portions 85 which are farthest from the handle 94. As illustrated in FIG. 9, a length A1 of each first inclined surface 85SX along the first direction D1 is longer than a length A2 of each second inclined surface 85SY along the first direction D1. A height B1 of each first inclined surface 85SX in the width direction of the vehicle is greater than a height B2 of each second inclined surface 85SY in the width direction of the vehicle. As illustrated in FIG. 8, each second engagement portion 85 preferably includes a rotation stopper wall 85B. Each rotation stopper wall 85B extends in the direction away from the handle 94. Each rotation stopper wall 85B is adjacent to the associated second inclined surface 85SY.

As illustrated in FIG. 5, the first filter element 98 is secured between the lid 90 and the air cleaner case 82. A direction extending along the axis L1 of the first filter element 98 from the lid 90 toward the first engagement portions 95 is defined as a third direction D3. A direction extending along the axis L1 of the first filter element 98 from the first engagement portions 95 toward the lid 90 is defined as a fourth direction D4. A pressing force is applied from the lid 90 to the first filter element 98 in the third direction D3, and a pressing force is applied from the air cleaner case 82 to the first filter element 98 in the fourth direction D4.

As illustrated in FIG. 5, the first filter element 98 divides an inner space of the air cleaner case 82 into a first chamber 82A and a second chamber 82B. The first chamber 82A is a "dirty side" chamber. Specifically, the first chamber 82A is a space in which air to be cleaned through the first filter element 98 flows. The second chamber 82B is a "clean side" chamber. Specifically, the second chamber 82B is a space in which air that has been cleaned by the first filter element 98 flows.

As illustrated in FIG. 5, the second filter element 99 divides an inner space of the second chamber 82B of the air cleaner case 82 into a third chamber 82C and a fourth chamber 82D. The third chamber 82C is located in an upstream portion of the second chamber 82B. The fourth chamber 82D is located in a downstream portion of the second chamber 82B. The third chamber 82C is a space in which air to be cleaned through the second filter element 99 flows. The fourth chamber 82D is a space in which air that has been cleaned by the second filter element 99 flows. The second filter element 99 is disposed to intersect the extension line L2 of the axis L1 of the first filter element 98.

The first filter element 98 preferably includes a mesh having a size larger than a mesh of the second filter element 99. Each of the first and second filter elements 98 and 99 according to the present preferred embodiment is preferably a wet element that is impregnated with oil, for example. Alternatively, each of the first and second filter elements 98 and 99 may be a dry element that is not impregnated with oil, for example.

As illustrated in FIG. 5, the air cleaner 80 preferably includes a gasket 78 disposed between the lid 90 and the opening end portion 82E of the air cleaner case 82. The gasket 78 is disposed inside the groove 91 of the lid 90. The gasket 78 seals a gap between the opening end portion 82E and the lid 90. The gasket 78 is disposed to extend across an entire circumferential region where the opening end portion 82E and the lid 90 face each other.

As illustrated in FIG. 1, the first suction pipe 86 is disposed above the battery 69. As illustrated in FIG. 2, the first suction pipe 86 is disposed rearward relative to the battery 69. A portion of the first suction pipe 86 is disposed inside the battery case 68. As illustrated in FIG. 4, the first suction pipe 86 preferably includes an air inlet 87 through which air is sucked into the air cleaner 80 from outside the air cleaner 80. More specifically, air is sucked into the first chamber 82A (see FIG. 5) from outside the air cleaner case 82 through the air inlet 87. As illustrated in FIG. 2, the air inlet 87 communicates with an interior of the battery case 68. As illustrated in FIG. 1, the air inlet 87 is disposed above the first and second seat portions 14L and 14R.

As illustrated in FIGS. 1 and 5, each second suction pipe 88 is connected to the cylinder head 73 of the engine 70 via a throttle body (not illustrated). Each second suction pipe 88 is disposed downstream of the second filter element 99. Each second suction pipe 88 preferably includes an air outlet 89 through which air inside the air cleaner 80 is discharged out of the air cleaner 80. More specifically, air inside the second chamber 82B is discharged out of the air cleaner case 82 through each air outlet 89. Thus, air inside the fourth chamber 82D is supplied through each air outlet 89 to the cylinder head 73 via the throttle body.

Figure 10:
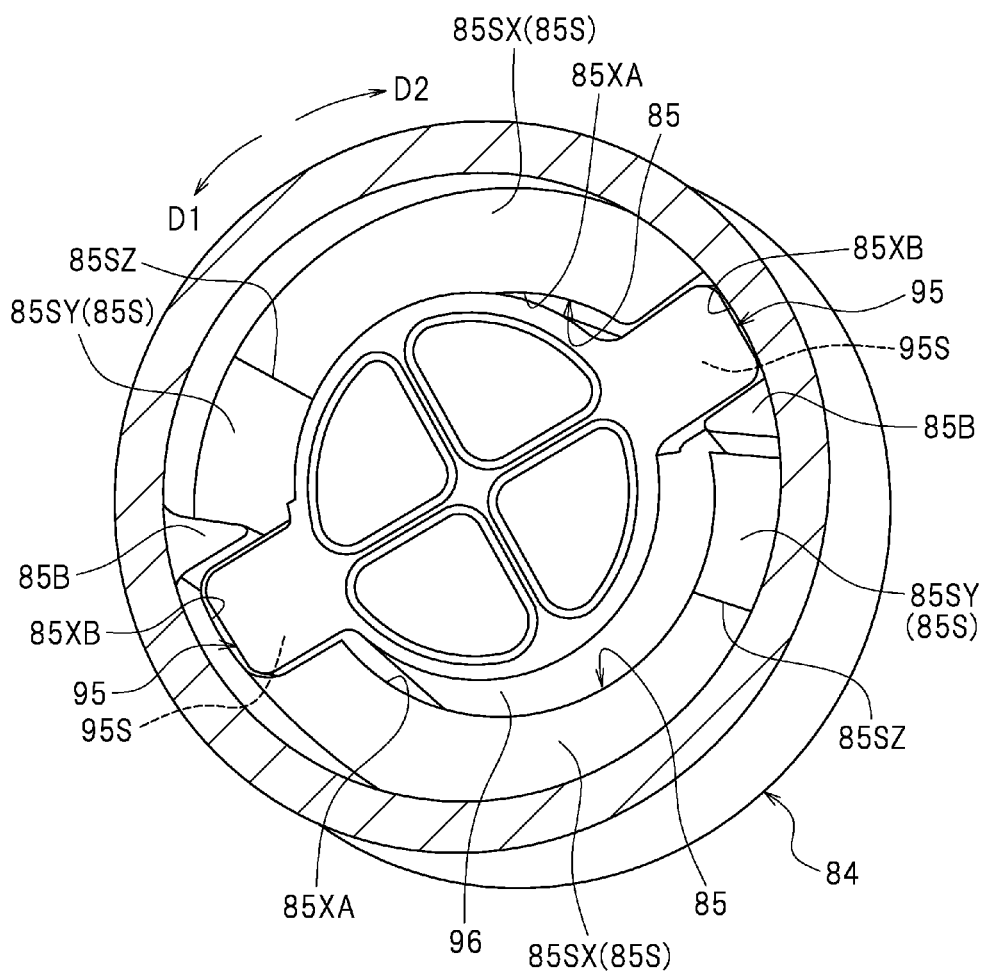
FIG. 10 is a perspective view of a portion of the air cleaner according to a preferred embodiment of the present invention, with the first and second engagement portions not engaged with each other.
Figure 11:
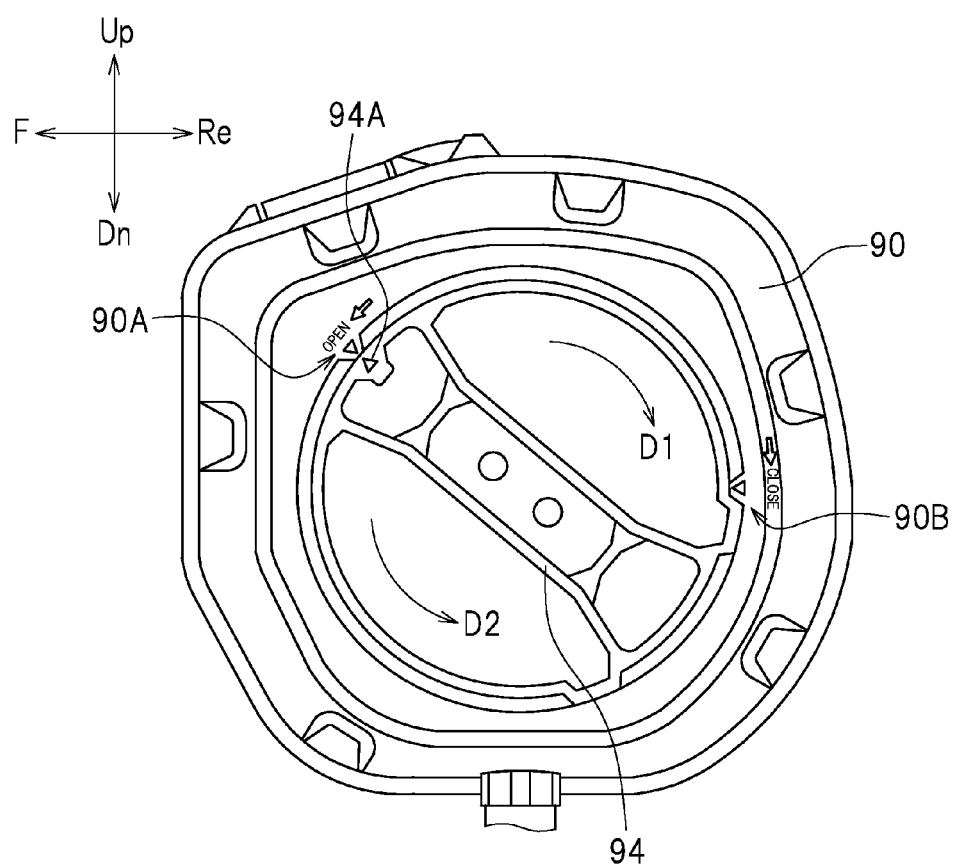
FIG. 11 is a left side view of a lid according to a preferred embodiment of the present invention.

Next, how the first and second engagement portions 95 and 85 are engaged with and disengaged from each other will be described. As illustrated in FIG. 10, the rod 96 is inserted into the first opening 85XA, and the first engagement portions 95 are inserted into the second openings 85XB. In this case, an arrow 94A of the handle 94 points at a first sign 90A on the lid 90 as illustrated in FIG. 11. When the arrow 94A points at the first sign 90A, the lid 90 is not fixed to the air cleaner case 82. As illustrated in FIG. 9, rotation of the handle 94 in the first direction D1 in FIG. 11 causes the first engagement portions 95 to move along the first direction D1, with the first engagement surfaces 95S and the first inclined surfaces 85SX in contact with each other. Thus, the lid 90 gradually moves in a direction toward the air cleaner case 82. Further rotation of the handle 94 in the first direction D1 in FIG. 11 causes the first engagement surfaces 95S to move beyond the points 85SZ farthest from the handle 94 and come into contact with the second inclined surfaces 85SY. As a result, engagement of the first and second engagement portions 95 and 85 is completed. This engagement of the first and second engagement portions 95 and 85 fixes the lid 90 to the air cleaner case 82. In this case, the arrow 94A of the handle 94 points at a second sign 90B on the lid 90 as illustrated in FIG. 4. When the arrow 94A points at the second sign 90B, the lid 90 is fixed to the air cleaner case 82. The handle 94 rotates by an angle of about 360 degrees or less. More specifically, the handle 94 rotates by an angle of about 360 degrees or less to move from a position at which the arrow 94A of the handle 94 points at the first sign 90A to a position at which the arrow 94A of the handle 94 points at the second sign 90B. The handle 94 preferably rotates by an angle of about 140 degrees, for example, in the present preferred embodiment.

The handle 94 also rotates in a second direction D2 opposite to the first direction D1 in FIG. 11, with the first and second engagement portions 95 and 85 engaged with each other. As illustrated in FIG. 9, the rotation of the handle 94 in the second direction D2 causes the first engagement portions 95 to move along the second direction D2, with the first engagement surfaces 95S and the second inclined surfaces 85SY in contact with each other. Further rotation of the handle 94 in the second direction D2 in FIG. 11 causes the first engagement surfaces 95S to move beyond the points 85SZ farthest from the handle 94 and come into contact with the first inclined surfaces 85SX, while causing the first engagement portions 95 to move along the second direction D2. Thus, the lid 90 gradually moves in a direction away from the air cleaner case 82, and then the first and second engagement portions 95 and 85 are disengaged from each other. The disengagement of the first and second engagement portions 95 and 85 allows the lid 90 to be detached from the air cleaner case 82.

Figure 12:
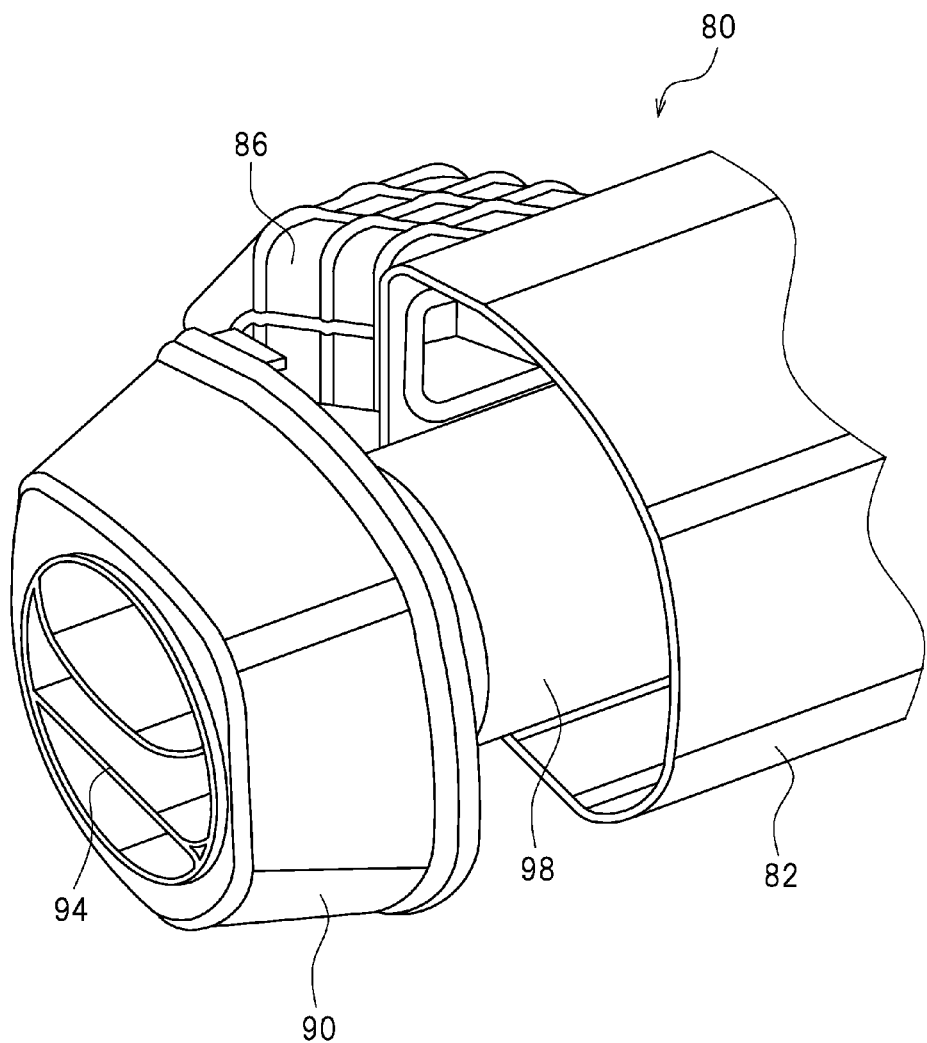
FIG. 12 is a perspective view of the air cleaner according to a preferred embodiment of the present invention, with the lid detached from the air cleaner to expose a first filter element.

As illustrated in FIG. 12, detaching the lid 90 from the air cleaner case 82 allows the first filter element 98, disposed inside the air cleaner case 82, to move along an axial direction of the first filter element 98. Thus, the first filter element 98 is easily detached from the air cleaner case 82 because the lid 90 is exposed above the placement surface 62 of the cargo bed 60.

The second engagement surfaces 85S according to the present preferred embodiment preferably include the first and second inclined surfaces 85SX and 85SY as illustrated in FIG. 7, but the second engagement surfaces 85S are required to include the first inclined surfaces 85SX only in some preferred embodiments of the present invention. Although the second engagement surfaces 85S according to the present preferred embodiment preferably include the first and second inclined surfaces 85SX and 85SY, the first engagement surfaces 95S may include only the first inclined surfaces in another preferred embodiment of the present invention. Alternatively, each of the first and second engagement surfaces 95S and 85S may include both the first and second inclined surfaces.

In the present preferred embodiment, the first and second engagement portions 95 and 85 preferably respectively include the first and second engagement surfaces 95S and 85S, and the first and second engagement surfaces 95S and 85S come into contact with each other, thus engaging the first and second engagement portions 95 and 85 with each other. However, the first and second engagement portions 95 and 85 may be engaged with each other in any other suitable manner. For example, the first and second engagement portions 95 and 85 may be respectively provided with external and internal threads, or may be respectively provided with internal and external threads, and the external and internal threads may be engaged with each other, thus engaging the first and second engagement portions 95 and 85 with each other.

As illustrated in FIG. 1, the air cleaner 80 of the ROV 1 is at least partially exposed above the placement surface 62 of the cargo bed 60 as described above. This enables a worker to easily reach the air cleaner 80 when performing maintenance of the air cleaner 80. For example, a worker has to remove a component such as an outer cover to reach an air cleaner when the air cleaner is disposed below a placement surface of a cargo bed, as in the vehicles known in the art. However, the ROV 1 according to various preferred embodiments of the present invention allows a worker to directly reach the air cleaner 80 without having to remove a component such as an outer cover, thus facilitating maintenance of the air cleaner 80.

As illustrated in FIG. 1, the up-down center position 80C of the air cleaner 80 according to the present preferred embodiment is located above the placement surface 62. Thus, the air cleaner 80 is largely exposed above the placement surface 62 of the cargo bed 60. This enables a worker to more easily reach the air cleaner 80, thus facilitating maintenance of the air cleaner 80.

As illustrated in FIG. 1, the lid 90 according to the present preferred embodiment preferably is exposed above the placement surface 62 of the cargo bed 60. This enables the lid 90 to be easily attached to and detached from the air cleaner case 82. Consequently, the first filter element 98 inside the air cleaner case 82 is easily attached to and detached from the air cleaner case 82, thus facilitating maintenance of the air cleaner 80.

As illustrated in FIG. 5, the first filter element 98 according to the present preferred embodiment preferably a tubular or substantially tubular shape, and the lid 90 is disposed on the extension line L2 of the axis L1 of the first filter element 98. This enables the first filter element 98 to be easily attached to and detached from the air cleaner case 82 by merely axially moving the first filter element 98.

As illustrated in FIG. 2, the placement surface 62 of the cargo bed 60 according to the present preferred embodiment is provided with the opening 63, and the air cleaner 80 and the opening 63 overlap with each other in the plan view of the vehicle. Consequently, the air cleaner 80 and the cargo bed 60 are disposed more compactly than when the air cleaner 80 and the opening 63 do not overlap with each other in the plan view of the vehicle, or than when the placement surface 62 is provided with no opening 63.

As illustrated in FIG. 2, the cargo bed 60 according to the present preferred embodiment preferably includes, behind the air cleaner 80, the vertical wall 64 extending upward from the placement surface 62 and extending in the width direction of the vehicle. This prevents interference between the air cleaner 80 and cargo placed on the cargo bed 60.

As illustrated in FIG. 2, the left end 80L of the air cleaner 80 according to the present preferred embodiment is located leftward relative to the battery 69, and the right end 80R of the air cleaner 80 according to the present preferred embodiment is located rightward of the battery 69. Consequently, the air cleaner 80 is compactly disposed substantially in a widthwise center of the vehicle, thus providing a large space for a component other than the air cleaner 80.

As illustrated in FIG. 1, the air inlet 87 according to the present preferred embodiment communicates with the interior of the battery case 68. Thus, foreign matter, such as mud and dust, thrown up during traveling of the vehicle is unlikely to enter the air inlet 87. Consequently, the air cleaner 80 requires less frequent maintenance.

As illustrated in FIG. 1, the air inlet 87 according to the present preferred embodiment is disposed above the first and second seat portions 14L and 14R. Thus, the air inlet 87 is disposed at a relatively high position, and foreign matter, such as mud and dust, thrown up during traveling of the vehicle is unlikely to enter the air inlet 87. Consequently, the air cleaner 80 requires less frequent maintenance.

As illustrated in FIG. 1, the engine 70 according to the present preferred embodiment is disposed under the air cleaner 80. This shortens the second suction pipes 88, thus reducing the cost of the ROV 1 and simplifying the structure of the ROV 1. As illustrated in FIG. 2, the left end 70L of the engine 70 is located leftward relative to the battery 69, and the right end 70R of the engine 70 is located rightward relative to the battery 69. Consequently, the engine 70 is compactly disposed substantially in the widthwise center of the vehicle, thus providing a large space for a component other than the engine 70.

The terms and expressions which have been used herein are used as terms of description and not of limitation, and there is no intention, in the use of such terms and expressions, of excluding any equivalents of the features shown and described or portions thereof, but it is recognized that various modifications are possible within the scope of the present invention claimed. While the present invention may be embodied in many different forms, a number of illustrative preferred embodiments are described herein with the understanding that the present disclosure is to be considered as providing examples of the principles of the present invention and that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   a body frame;
   a plurality of seats supported by the body frame and aligned in a width direction of the vehicle;
   a cargo bed disposed rearward relative to the seats and supported by the body frame, the cargo bed including a placement surface on which cargo is to be placed; and
   an air cleaner disposed rearward relative to the plurality of seats, the air cleaner being at least partially exposed above the placement surface; wherein
   the air cleaner is disposed rightward of a left end of the placement surface in the width direction of the vehicle and leftward of a right end of the placement surface in the width direction of the vehicle.

2. The vehicle according to claim 1, wherein a center position of the air cleaner in an up-down direction is located above the placement surface.

3. The vehicle according to claim 1, wherein the air cleaner includes:
   an air cleaner case including a first opening;
   a filter element detachably disposed inside the air cleaner case; and
   a lid detachably attached to the air cleaner case to cover the first opening; wherein
   the lid is exposed above the placement surface.

4. The vehicle according to claim 3, wherein the filter element has a tubular or substantially tubular shape; and the lid is disposed along an extension line of an axis of the filter element.

5. The vehicle according to claim 1, wherein the cargo bed includes, behind the air cleaner, a vertical wall extending upward from the placement surface and extending in the width direction of the vehicle.

6. The vehicle according to claim 1, wherein the placement surface is disposed rightward and leftward of the air cleaner in the width direction of the vehicle as seen in a plan view of the vehicle.

7. A vehicle comprising:
   a body frame;
   a plurality of seats supported by the body frame and aligned in a width direction of the vehicle;
   a cargo bed disposed rearward relative to the seats and supported by the body frame, the cargo bed including a placement surface on which cargo is to be placed; and
   an air cleaner disposed rearward relative to the plurality of seats, the air cleaner being at least partially exposed above the placement surface; wherein
   the placement surface of the cargo bed includes a second opening; and the air cleaner and the second opening overlap with each other in a plan view of the vehicle.

8. A vehicle comprising:
   a body frame;
   a plurality of seats supported by the body frame and aligned in a width direction of the vehicle;
   a cargo bed disposed rearward relative to the seats and supported by the body frame, the cargo bed including a placement surface on which cargo is to be placed; and
   an air cleaner disposed rearward relative to the plurality of seats, the air cleaner being at least partially exposed above the placement surface; wherein
   the plurality of seats include:
   a first seat supported by the body frame; and
   a second seat disposed rightward of the first seat and supported by the body frame;

the vehicle further includes:
  a battery case disposed between the first seat and the second seat; and
  a battery inside the battery case;
  a left end of the air cleaner is located leftward relative to the battery; and
  a right end of the air cleaner is located rightward relative to the battery.

9. The vehicle according to claim 8, wherein the air cleaner includes a first suction pipe disposed above the battery, the first suction pipe includes an air inlet through which air is sucked into the air cleaner from outside the air cleaner, and the air inlet communicates with an interior of the battery case.

10. The vehicle according to claim 9, wherein the first seat includes a first seat portion on which a first occupant sits, the second seat includes a second seat portion on which a second occupant sits, and the air inlet is disposed above the first seat portion and the second seat portion.

11. The vehicle according to claim 8, further comprising an engine disposed behind the first seat and the second seat and under the air cleaner; wherein
  the air cleaner includes at least one second suction pipe connected to the engine;
  a left end of the engine is located leftward relative to the battery; and
  a right end of the engine is located rightward relative to the battery.

12. A vehicle comprising:
  a body frame;
  a plurality of seats supported by the body frame and aligned in a width direction of the vehicle;
  a cargo bed disposed rearward relative to the seats and supported by the body frame, the cargo bed including a placement surface on which cargo is to be placed; and
  an air cleaner disposed rearward relative to the plurality of seats, the air cleaner being at least partially exposed above the placement surface; wherein
  the body frame is a pipe frame; and
  the air cleaner is disposed rightward of a left end of the body frame in the width direction of the vehicle and leftward of a right end of the body frame in the width direction of the vehicle.

13. The vehicle according to claim 12, wherein the air cleaner is disposed above a lower end of the body frame and below an upper end of the body frame.

14. The vehicle according to claim 13, wherein the body frame includes:
  a main frame extending in a front-rear direction of the vehicle;
  a center frame disposed above the main frame;
  a front frame disposed in front of the center frame; and
  a rear frame disposed behind the center frame; and
  the air cleaner is disposed above a lower end of the main frame and below an upper end of the rear frame.

15. The vehicle according to claim 14, wherein
  the center frame includes an upper center frame disposed above the plurality of seats;
  the rear frame includes an upper rear frame connected to the upper center frame; and
  the air cleaner is disposed below the upper rear frame.

16. The vehicle according to claim 14, wherein the center frame includes:
  an upper center frame at least partially disposed above the plurality of seats; and
  a lower center frame at least partially disposed below the plurality of seats; and
  the air cleaner is at least partially disposed behind the lower center frame.

* * * * *